(12) United States Patent
Wen et al.

(10) Patent No.: US 12,095,248 B2
(45) Date of Patent: Sep. 17, 2024

(54) WEATHER-RESISTANT FEEDTHROUGH HOUSING

(71) Applicant: HARTING Electric Stiftung & Co. KG, Espelkamp (DE)

(72) Inventors: Ensign Wen, Zhuhai (CN); Walter Gerstl, Breitenfurt bei Wien (AT); Denny Hellige, Bad Oeyenhausen (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 212 days.

(21) Appl. No.: 17/800,942

(22) PCT Filed: Feb. 12, 2021

(86) PCT No.: PCT/DE2021/100139
§ 371 (c)(1),
(2) Date: Aug. 19, 2022

(87) PCT Pub. No.: WO2021/164822
PCT Pub. Date: Aug. 26, 2021

(65) Prior Publication Data
US 2023/0135409 A1  May 4, 2023

(30) Foreign Application Priority Data
Feb. 21, 2020 (DE) .................. 10 2020 104 622.7

(51) Int. Cl.
*H02G 3/08* (2006.01)
*H02G 3/10* (2006.01)
*H02G 3/22* (2006.01)

(52) U.S. Cl.
CPC ............... *H02G 3/088* (2013.01); *H02G 3/10* (2013.01); *H02G 3/22* (2013.01)

(58) Field of Classification Search
None
See application file for complete search history.

(56) References Cited

U.S. PATENT DOCUMENTS

| | | | |
|---|---|---|---|
| 7,098,399 B1 * | 8/2006 | Gretz | H02G 3/12 174/53 |
| 7,258,556 B1 | 8/2007 | Boutros et al. | |
| 7,396,996 B1 | 7/2008 | Shotey et al. | |
| 9,318,888 B1 * | 4/2016 | Baldwin | H02G 3/12 |
| 9,935,436 B1 | 4/2018 | Baldwin | |
| 10,109,989 B1 | 10/2018 | Baldwin et al. | |
| 2003/0042034 A1 * | 3/2003 | Roesch | H02G 3/105 174/50 |
| 2005/0194167 A1 | 9/2005 | Kiyota et al. | |
| 2015/0083485 A1 * | 3/2015 | Jolly | H02G 3/14 312/223.1 |
| 2021/0408774 A1 | 12/2021 | Hellige et al. | |

FOREIGN PATENT DOCUMENTS

| | | |
|---|---|---|
| CN | 1901304 A | 1/2007 |
| DE | 202010008934 U1 | 2/2012 |
| WO | 2013164420 A2 | 11/2013 |
| WO | 2020156610 A1 | 8/2020 |

* cited by examiner

*Primary Examiner* — Krystal Robinson
(74) *Attorney, Agent, or Firm* — Smartpat PLC

(57) ABSTRACT

A feedthrough housing (1) for fastening to a wall for one or more lines and/or cables to be fed through comprises a housing body (2) and a matching removable housing cover (3). The housing cover (3) has a region (4, 4') which is directed towards the wall and has a concave contour.

8 Claims, 2 Drawing Sheets

WEATHER-RESISTANT FEEDTHROUGH HOUSING

TECHNICAL FIELD

The disclosure relates to a feedthrough housing for securing to a wall for feeding through one or more lines and/or cables. Such feedthrough housings are required to guide lines or cables from a closed region into another region or vice versa.

BACKGROUND

EP 2 845 277 A2 sets out a bushing housing which is arranged on a device wall. The feedthrough housing comprises a lower housing portion and an upper housing portion. In the lower housing portion there are provided recesses in which a plurality of cable feedthrough seals are arranged for feeding through cables. The feedthrough housing has a substantially parallelepipedal basic shape. If water penetrates between the feedthrough housing and device wall, at low temperature the feedthrough housing may be ejected from the device wall as a result of the formation of ice. Such a feedthrough housing can therefore be used only in a limited manner externally.

The German Patent and Trademark Office has in the priority application with respect to the present application searched the following prior art: U.S. Pat. No. 7,258,556 B1, WO 2020/156610 A1, EP 2 845 277 A2 and WO 2013/164420 A2.

SUMMARY

The present application presents a weather-resistant feedthrough housing.

The feedthrough housing is provided for securing to a wall for feeding through one or more lines and/or cables. Such a feedthrough housing is, for example, used in the rail sector in order to connect two wagons to each other by means of lines. The feedthrough housings are generally fitted to an outer wall of the wagons and are in this instance subjected to the usual environmental influences.

The feedthrough housing has a housing member and a compatible, removable housing cover. Via the housing cover, access to the cables or lines which are introduced into the feedthrough housing can be achieved. To this end, the feedthrough housing or the housing member thereof preferably has an opening which corresponds to an opening in the wall. The housing member advantageously has at the wall side a circumferential seal which comprises the opening and which thus protects the feedthrough housing at the wall side from the penetration of media.

The cables or lines which extend into the feedthrough housing may, for example, be connected to modular plug connection systems which act as plug interfaces for plug connections which are intended to be connected.

The housing cover has a region which is directed toward the wall and which has a concave contour. In this instance, the term "concave" is intended to be understood to mean that the contour is directed away from the wall, that is to say, is directed inwardly (into the interior of the feedthrough housing).

Water which penetrates between the wall and feedthrough housing can drain away at the short or outer sides of this contour. When, for example, snow accumulates between the wall and feedthrough housing, the snow can also flow away at the side during melting. At low temperatures, ice which is formed can be displaced to the short sides of the contour. The feedthrough housing is thereby not mechanically loaded. The connection between the feedthrough housing and the wall remains stable and media-tight.

In a particularly preferred embodiment, the region which is directed toward the wall, when viewed as a plan view, has a rectangular basic shape with an equal-sided trapezoidal attachment which adjoins it at the top.

Preferably, the contour extends between the outer short sides of the rectangular basic shape and/or between the outer sides of the trapezoidal attachment in a concave manner.

BRIEF DESCRIPTION OF THE DRAWINGS

An embodiment of the invention is illustrated in the drawings and is explained in greater detail below.

DETAILED DESCRIPTION

Figure 1:
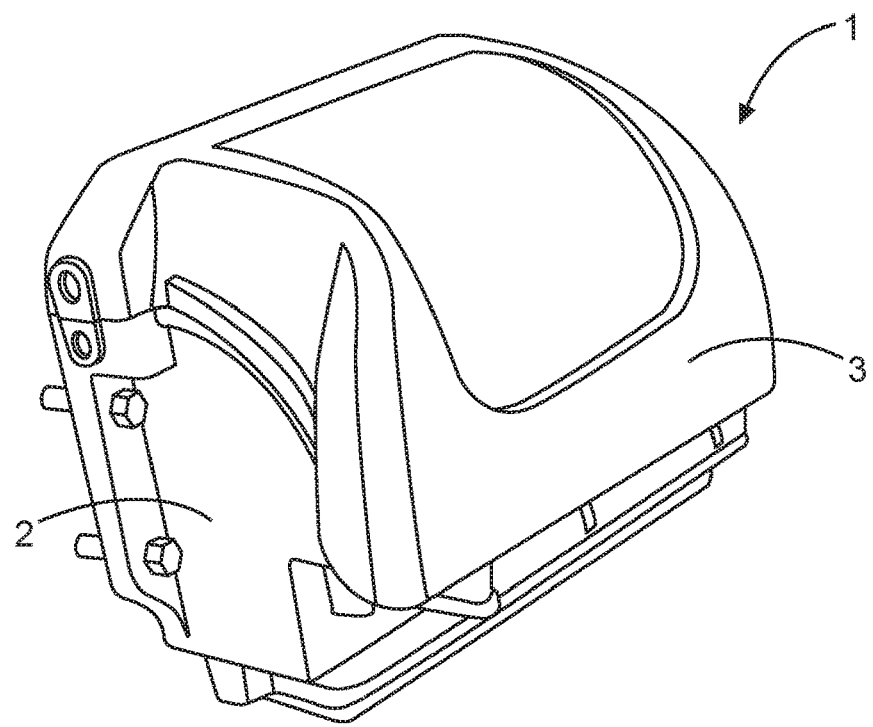
FIG. 1 shows a perspective illustration of the front side of a feedthrough housing.
Figure 2:
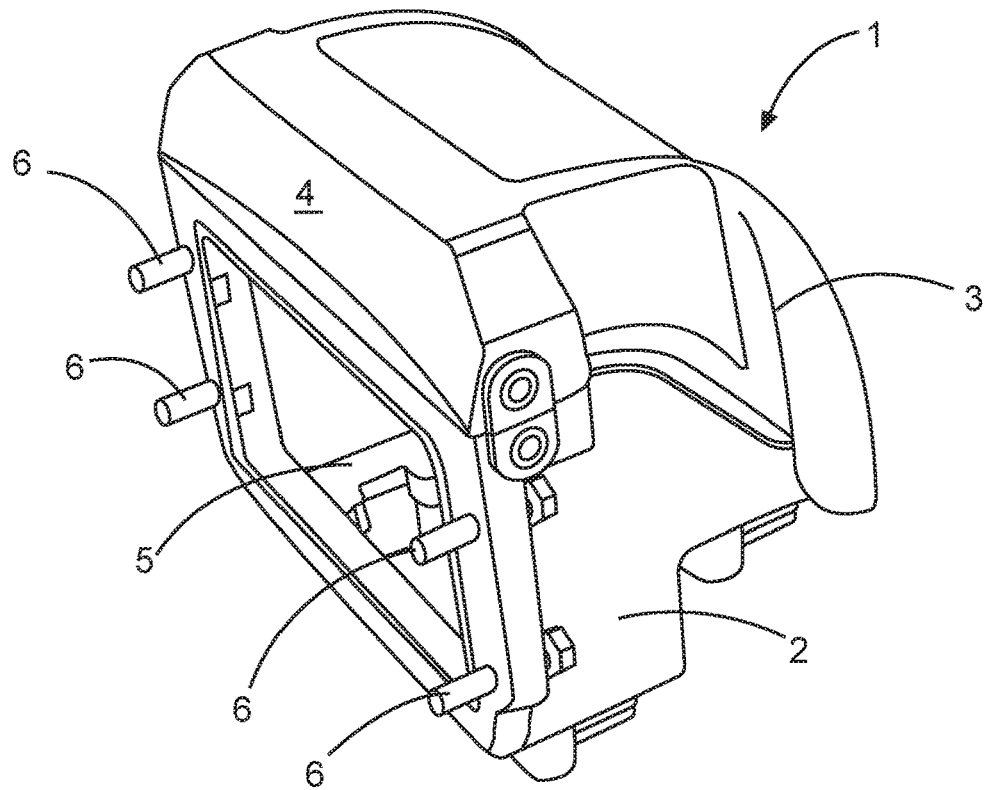
FIG. 2 shows a perspective illustration of the rear side of a feedthrough housing.

The figures contain partially simplified, schematic illustrations. Identical reference numerals are sometimes used for elements which are the same but which may not be identical. Various views of the identical elements could be scaled differently.

FIG. 1 shows the front side of a feedthrough housing 1. The feedthrough housing 1 comprises a housing member 2 and a compatible housing cover 3. The housing cover 3 can be removed and is configured in such a manner that, by removing the housing cover 3, the largest possible structural space is provided in the feedthrough housing 1. This facilitates the installation and maintenance operations which have to be carried out with such a feedthrough housing.

The housing member 2 and the housing cover 3 comprise a metal material and are each provided with a weather-resistant coating.

In the housing member 2, there are laterally provided two openings in each case in which screws 6 for securing the feedthrough housing 1 to a wall (not shown) are arranged.

The housing cover 3 has a region 4 which is directed toward the wall and which in turn has a concave contour.

Figure 3:
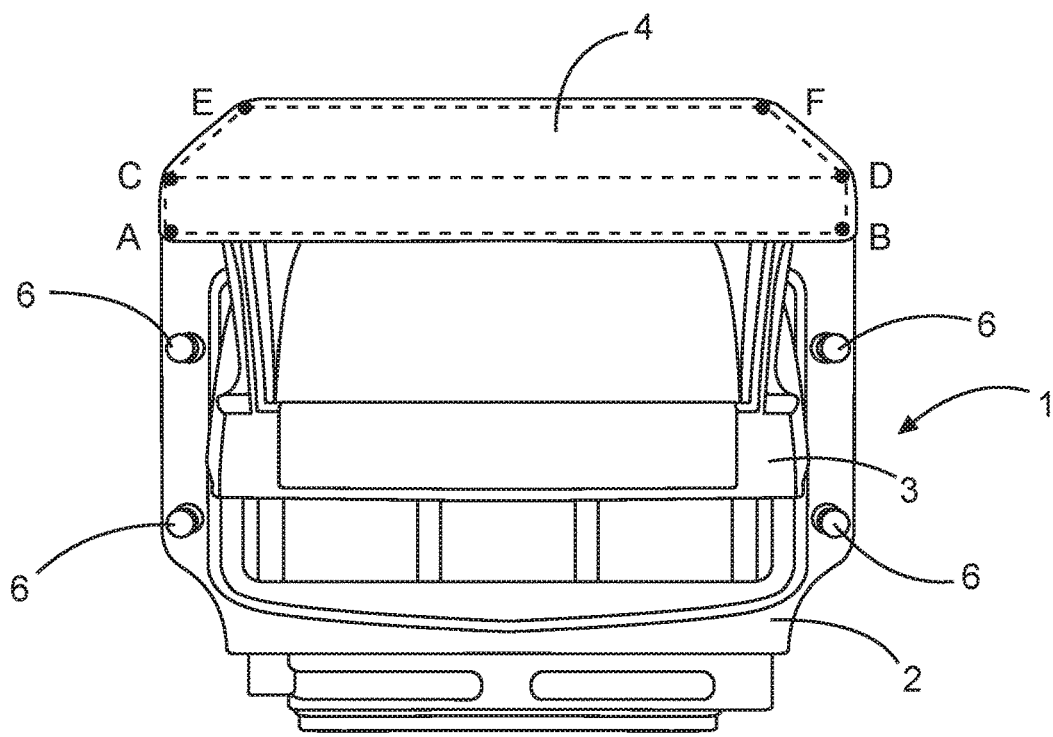
FIG. 3 shows a plan view of the rear side of a feedthrough housing.

The concave region 4 is illustrated in FIG. 3 in a highly schematic manner. The concave region 4 can be described purely schematically by means of the corner points A, B, C, D, E and F in FIG. 3. The corner points A, B, C, and D form a rectangle. Between the short sides A, C and B, D of the rectangle, a concave region at least partially extends, that is to say, the housing cover 3 is curved in this instance toward the interior of the image. The corner points C, D, E and F form an isosceles trapezium. Between the trapezium sides C, E and D, F, a completely concave region extends. The housing cover 3 is also curved in this instance toward the interior of the image.

Figure 4:
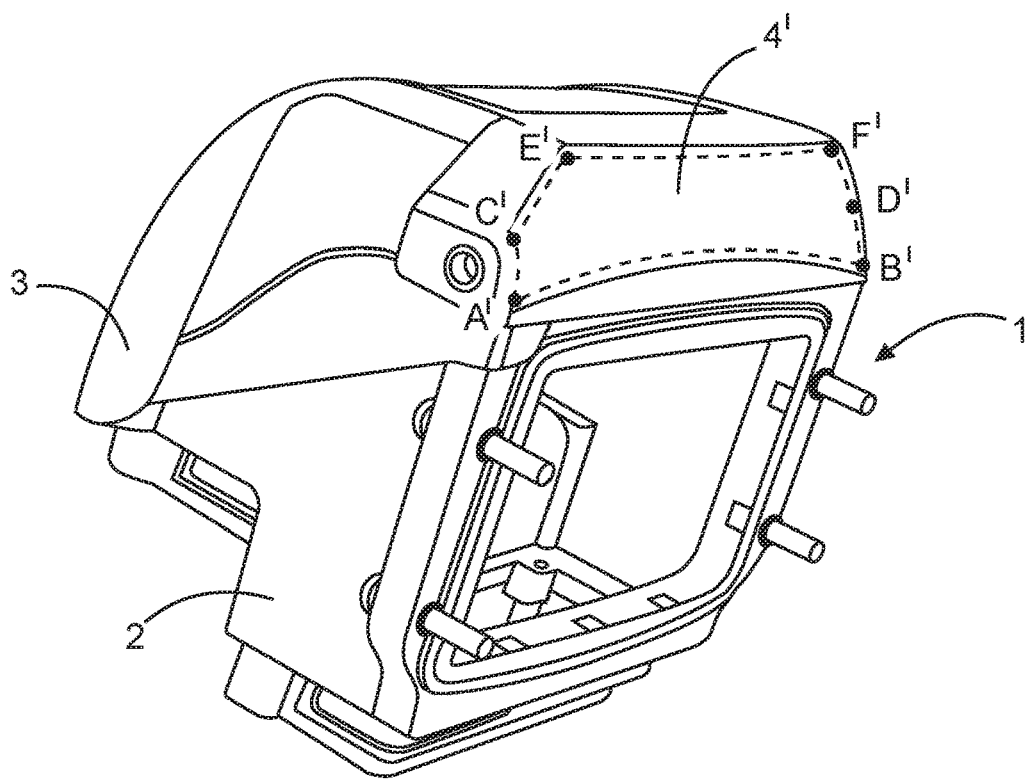
FIG. 4 shows a perspective illustration of the rear side of a feedthrough housing.

In FIG. 4, the concave region 4' of the feedthrough housing 1 is illustrated in greater detail. The concave region 4' is defined in FIG. 4 by the corner points A', B', C', D', E' and F'. For illustration, the corner points A', B', C', D', E' and F' are connected by means of a dashed line. In this instance, the corner points A', B', C' and D' substantially form a rectangle again, wherein the corner points A' and B' are connected to each other by means of a circle segment. The corner points C', D', E' and F' can again be considered geometrically as an isosceles trapezium.

Even if various aspects or features of the invention are shown in combination in the figures, for the person skilled in the art—unless otherwise stated—it is evident that the combinations illustrated and discussed are not the only ones possible. In particular, mutually corresponding units or feature complexes from different embodiments are interchangeable.

LIST OF REFERENCE NUMERALS

1 Feedthrough housing
2 Housing member
3 Housing cover
4 Region
5 Opening
6 Screw
A, B, C, D, E, F Corner points

The invention claimed is:

1. A feedthrough housing (1) for securing to a wall for feeding through one or more lines and/or cables, comprising:
   a housing member (2) having an opening (5) formed on a rear side thereof; and
   a housing cover (3) arranged above the housing member (2),
   wherein the housing cover (3) has a region (4, 4') proximal to the wall above the opening (5),
   wherein the housing cover (3) extends forwardly from the region (4, 4') proximal to the wall above a front of the housing member (2), and
   wherein the region (4, 4') proximal to the wall has a concave contour configured to drain water laterally away from the opening (5).

2. The feedthrough housing (1) as claimed in claim 1, wherein the region (4, 4') proximal to the wall is defined by corner points (A, B, C, D, E and F; A', B', C', D', E' and F').

3. The feedthrough housing (1) as claimed in claim 2, wherein the region (4, 4') proximal to the wall has a substantially rectangular basic shape (A, B, C, D; A', B', C', D') having a trapezoidal attachment (C, D, E, F; C', D', E', F').

4. The feedthrough housing (1) as claimed in claim 3, wherein the region (4, 4') proximal to the wall extends at least partially in a concave manner between outer short sides (A, C; B, D) of the substantially rectangular basic shape.

5. The feedthrough housing (1) as claimed in claim 3, wherein the region (4, 4') extends in a concave manner between outer sides (C, E; D, F; C', E'; D', F') of the trapezoidal attachment.

6. The feedthrough housing (1) as claimed in claim 1, wherein the housing member (2) has openings for securing the feedthrough housing (1) to the wall.

7. The feedthrough housing (1) as claimed in claim 1, wherein the opening (5) corresponds to an opening (1) in the wall.

8. The feedthrough housing (1) as claimed in claim 7, wherein the housing member (2) has a circumferential seal which surrounds the opening (5) at the wall.

* * * * *